US010602656B2

(12) United States Patent
Bartelson et al.

(10) Patent No.: US 10,602,656 B2
(45) Date of Patent: Mar. 31, 2020

(54) SKIP COMPENSATION SYSTEM

(71) Applicant: Deere & Company, Moline, IL (US)

(72) Inventors: Matt D. Bartelson, Moline, IL (US); Todd N. Signer, Bettendorf, IA (US)

(73) Assignee: Deere & Company, Moline, IL (US)

( * ) Notice: Subject to any disclaimer, the term of this patent is extended or adjusted under 35 U.S.C. 154(b) by 104 days.

(21) Appl. No.: 15/669,424

(22) Filed: Aug. 4, 2017

(65) Prior Publication Data
US 2019/0037765 A1 Feb. 7, 2019

(51) Int. Cl.
A01C 7/10 (2006.01)
A01C 21/00 (2006.01)
A01C 7/12 (2006.01)
A01C 7/04 (2006.01)
A01C 7/20 (2006.01)
A01C 5/06 (2006.01)

(52) U.S. Cl.
CPC ............ *A01C 7/105* (2013.01); *A01C 7/046* (2013.01); *A01C 7/102* (2013.01); *A01C 7/127* (2013.01); *A01C 21/00* (2013.01); *A01C 5/064* (2013.01); *A01C 5/068* (2013.01); *A01C 7/20* (2013.01); *A01C 7/203* (2013.01)

(58) Field of Classification Search
CPC ......... A01C 7/105; A01C 7/046; A01C 7/127; A01C 21/00; A01C 5/064; A01C 5/068; A01C 7/203
USPC .......................................................... 701/50
See application file for complete search history.

(56) References Cited

U.S. PATENT DOCUMENTS

| 6,150,158 | A  | * | 11/2000 | Bhide ................. A01H 4/001 221/211 |
| 6,553,312 | B2 |   | 4/2003  | Upadhyaya et al. |
| 7,591,226 | B2 |   | 9/2009  | Dix et al. |
| 8,074,586 | B2 |   | 12/2011 | Garner et al. |
| 8,365,678 | B2 | * | 2/2013  | Morbidelli ............... A47B 1/05 108/73 |
| 8,365,679 | B2 | * | 2/2013  | Landphair ............ A01B 79/005 111/200 |
| 8,746,159 | B2 |   | 6/2014  | Garner et al. |

(Continued)

FOREIGN PATENT DOCUMENTS

| EP | 2420122 A1 * | 2/2012 | ........... A01B 79/005 |
| EP | 2747541 A1   | 7/2014 | |

(Continued)

OTHER PUBLICATIONS

EP Patent Application No. 18181768.5-1011 Extended European Search Report dated Dec. 13, 2018, 12 pages.

(Continued)

*Primary Examiner* — Marthe Y Marc-Coleman
(74) *Attorney, Agent, or Firm* — Chistopher J. Volkmann; Kelly, Holt & Christenson, PLLC

(57) ABSTRACT

An agricultural machine includes a motor configured to drive a seeding system that is, itself, configured to meter and deliver seed from the agricultural machine. The agricultural machine also includes a sensor configured to sense a characteristic of the seeding system and a skip detector component, that receives the sensor signal and detects a seed skip in the seeding system. Based on the detected seed skip, a processing system generates an operating parameter of the motor, and controls the motor based on the operating parameter.

20 Claims, 7 Drawing Sheets

(56) References Cited

U.S. PATENT DOCUMENTS

| | | | |
|---|---|---|---|
| 8,850,997 B2* | 10/2014 | Silbernagel | A01C 7/046 |
| | | | 111/185 |
| 9,043,951 B2 | 6/2015 | Tolstedt et al. | |
| 9,955,625 B2 | 5/2018 | Baurer et al. | |
| 2013/0049198 A1 | 2/2013 | Liao et al. | |
| 2014/0182494 A1* | 7/2014 | Friestad | A01C 7/046 |
| | | | 111/171 |
| 2014/0230705 A1* | 8/2014 | Radtke | A01C 7/046 |
| | | | 111/177 |
| 2014/0261118 A1* | 9/2014 | Mayerle | A01C 7/102 |
| | | | 111/184 |
| 2015/0319916 A1* | 11/2015 | Garner | A01C 7/08 |
| | | | 111/171 |
| 2016/0057923 A1* | 3/2016 | Sauder | A01C 7/12 |
| | | | 324/207.25 |
| 2016/0227700 A1* | 8/2016 | Wendte | A01C 7/20 |
| 2016/0374260 A1* | 12/2016 | Kowalchuk | A01C 1/06 |
| | | | 111/170 |
| 2018/0092294 A1* | 4/2018 | Hubner | A01C 7/105 |

FOREIGN PATENT DOCUMENTS

| | | |
|---|---|---|
| WO | 2007136606 A2 | 11/2007 |
| WO | 2008155235 A1 | 12/2008 |

OTHER PUBLICATIONS

Application and Drawings for U.S. Appl. No. 16/670,383, filed Oct. 31, 2019, 73 pages.
Application and Drawings for U.S. Appl. No. 16/670,312, filed Oct. 31, 2019, 73 pages.

* cited by examiner

SKIP COMPENSATION SYSTEM

FIELD OF THE DESCRIPTION

The present description relates to planting equipment. More specifically, the present description relates to generating a motor operating parameter and carrying out motor control according to the operating parameter based on a detected seed skip in an agricultural machine.

BACKGROUND

There are a wide variety of different types of agricultural seeding or planting machines. They can include row crop planters, grain drills, air seeders or the like. These machines place seeds at a desired depth within a plurality of parallel seed trenches that are formed in the soil. Thus, these machines can carry one or more seed hoppers. The mechanisms that are used for moving the seed from the seed hopper to the ground often include a seed metering system and a seed delivery system.

The seed metering system receives the seeds in a bulk manner, and divides the seeds into smaller quantities (such as a single seed, or a small number of seeds—depending on the seed size and seed type) and delivers the metered seeds to the seed delivery system. In one example, the seed metering system uses a rotating mechanism (which is normally a disc or a concave or bowl-shaped mechanism) that has seed receiving apertures, that receive the seeds from a seed pool and move the seeds from the seed pool to the seed delivery system which delivers the seeds to the ground (or to a location below the surface of the ground, such as in a trench). The seeds can be biased into the seed apertures in the seed metering system using air pressure (such as a vacuum or a positive air pressure differential).

There are also different types of seed delivery systems that move the seed from the seed metering system to the ground. One seed delivery system is a gravity drop system that includes a seed tube that has an inlet position below the seed metering system. Metered seeds from the seed metering system are dropped into the seed tube and fall (via gravitational force) through the seed tube into the seed trench. Other types of seed delivery systems are assistive systems, in that they do not simply rely on gravity to move the seed from the metering mechanism into the ground. Instead, such systems actively capture the seeds from the seed meter and physically move the seeds from the meter to a lower opening, where they exit into the ground or trench.

In these types of planting machines, the metering system and the delivery system are both often driven by separate actuators. The actuators can be electric or other machines.

The discussion above is merely provided for general background information and is not intended to be used as an aid in determining the scope of the claimed subject matter.

SUMMARY

An agricultural machine includes a motor configured to drive a seeding system that is, itself, configured to meter and deliver seed from the agricultural machine. The agricultural machine also includes a sensor configured to sense a characteristic of the seeding system and a skip detector component, that receives the sensor signal and detects a seed skip in the seeding system. Based on the detected seed skip, a processing system generates an operating parameter of the motor, and controls the motor based on the operating parameter.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Seed metering systems and seed delivery systems can often be subjected to a variety of conditions that lead to an irregularity in the metering and delivery of a seed from an agricultural machine to a furrow. For example, in operation, the seed metering system is designed to utilize a differential air pressure to retain a pool of seeds in a singular fashion within receiving apertures located adjacent an outer perimeter of the seed metering system. As the seed metering system rotates, the individual seeds are subsequently transferred to a seed delivery system in an ordered manner. However, variability in air pressure, irregular seed sizes, foreign materials, and other conditions can lead to a seed skip, (an absence of seed between two positions or receiving cells where a seed would normally be present). This can lead to a decrease in yield potential as a seed will not be delivered from the seed delivery system to a furrow, at the desired spacing, and subsequently produce a plant and eventually a crop. In accordance with one example, if a seed skip is detected in the seed metering system and/or the seed delivery system, a motor controller can operate the motor(s) driving the seed metering system and/or the seed delivery system in accordance with a generated operating parameter to compensate for the detected seed skip.

Figure 1:
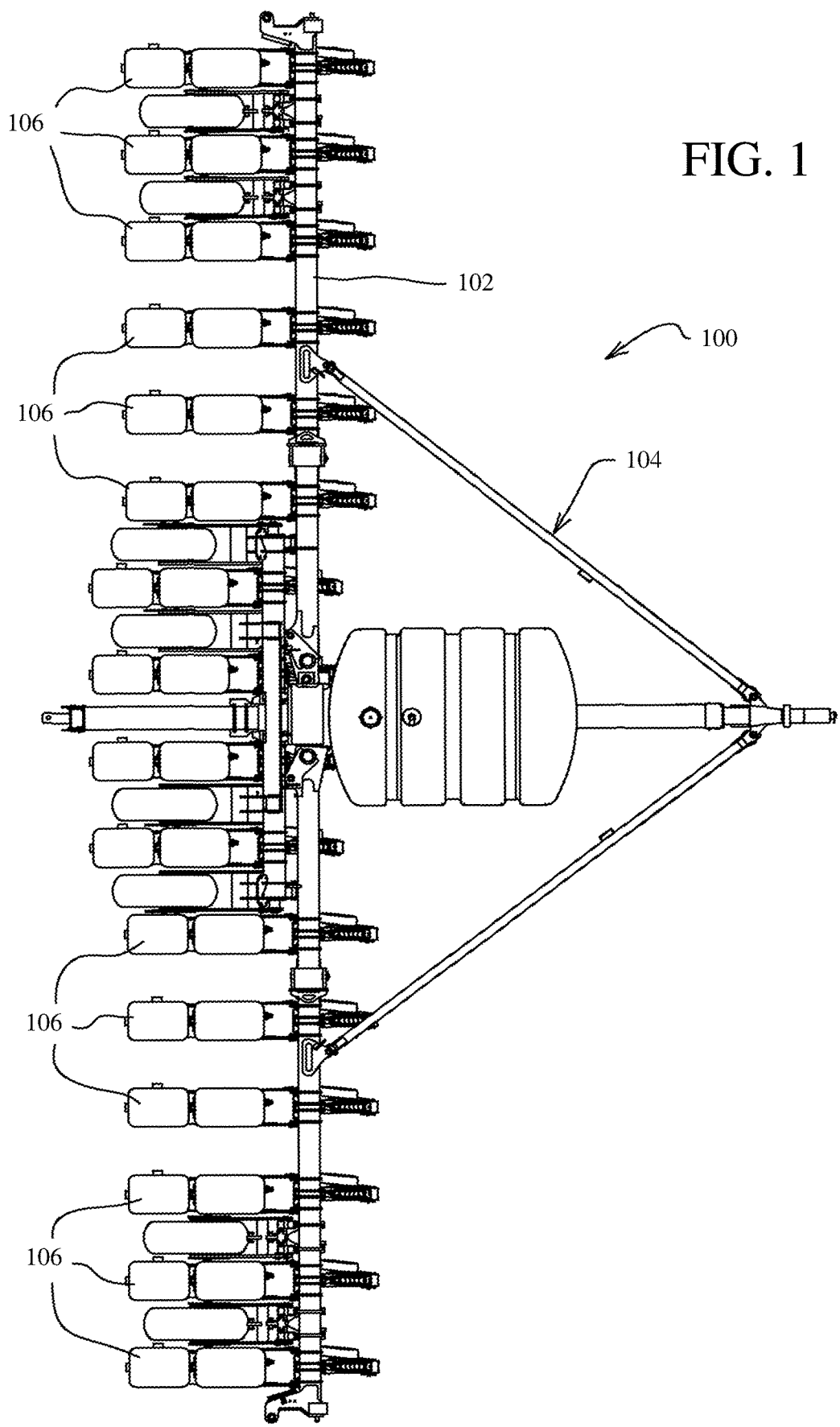
FIG. 1 shows one example of a top view of an agricultural machine.

FIG. 1 is a top view of one example of an agricultural machine 100. Agricultural machine 100 illustratively includes a toolbar 102 that is part of a frame 104. FIG. 1 also shows that a plurality of row units 106 are mounted to the toolbar. Agricultural machine 100 can be towed behind another machine, such as a tractor.

Figure 2:
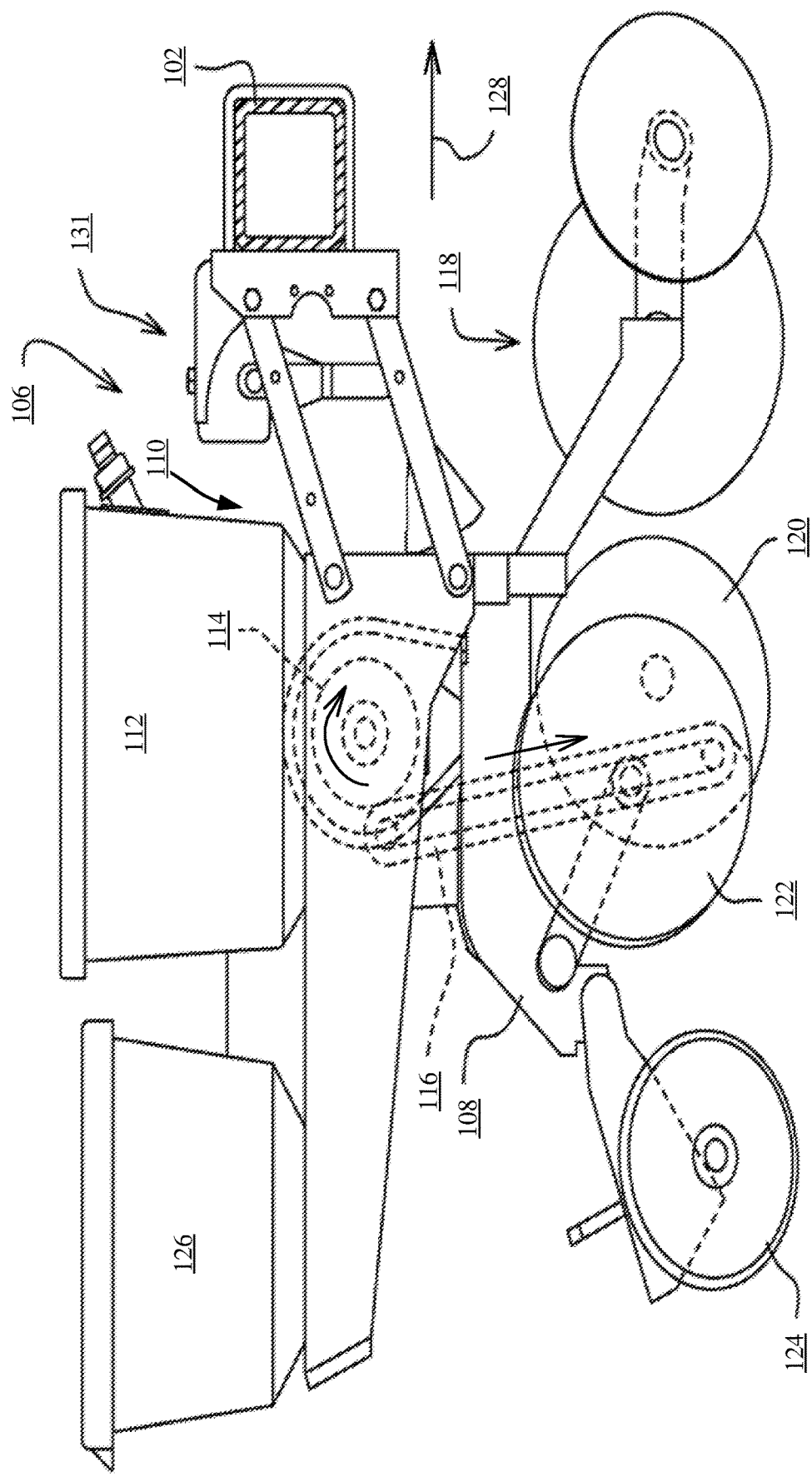
FIG. 2 shows one example of a side view of a row unit of the agricultural machine shown in FIG. 1.

FIG. 2 is a side view showing one example of a row unit 106 in more detail. FIG. 2 shows that each row unit 106 illustratively has a frame 108. Frame 108 is illustratively connected to toolbar 102 by a linkage shown generally at 110. Linkage 110 is illustratively mounted to toolbar 102 so that it can move upwardly and downwardly (relative to toolbar 102).

Row unit 106 also illustratively has a seed hopper 112 that stores seed. The seed is provided from hopper 112 to a seed metering system 114 that meters the seed and provides the metered seed to a seed delivery system 116 that delivers the seed from the seed metering system 114 to the furrow or trench generated by the row unit. In one example, seed metering system 114 uses a rotatable member, such as a disc or concave-shaped rotating member, and an air pressure differential to retain seed on the disc and move it from a seed pool of seeds (provided from hopper 112) to the seed delivery system 116. Other types of meters can be used as well.

FIG. 2 also shows that, in one example, row unit 106 illustratively includes a row cleaner 118, a furrow opener 120, a set of gauge wheels 122, and a set of closing wheels 124. It can also include an additional hopper 126 that can be used to provide additional material, such as a fertilizer or another chemical.

In operation, as row unit 106 moves in the direction generally indicated by arrow 128, row cleaner 118 generally cleans the row ahead of the opener 120 to remove plant debris from the previous growing season and the opener 120 opens a furrow in the soil. Gauge wheels 122 illustratively control a depth of the furrow, and seed is metered by seed metering system 114 and delivered to the furrow by seed delivery system 116. Closing wheels 124 close the trench over the seed. A downforce generator 131 can also be provided to controllably exert downforce to keep the row unit in desired engagement with the soil.

Figure 3:
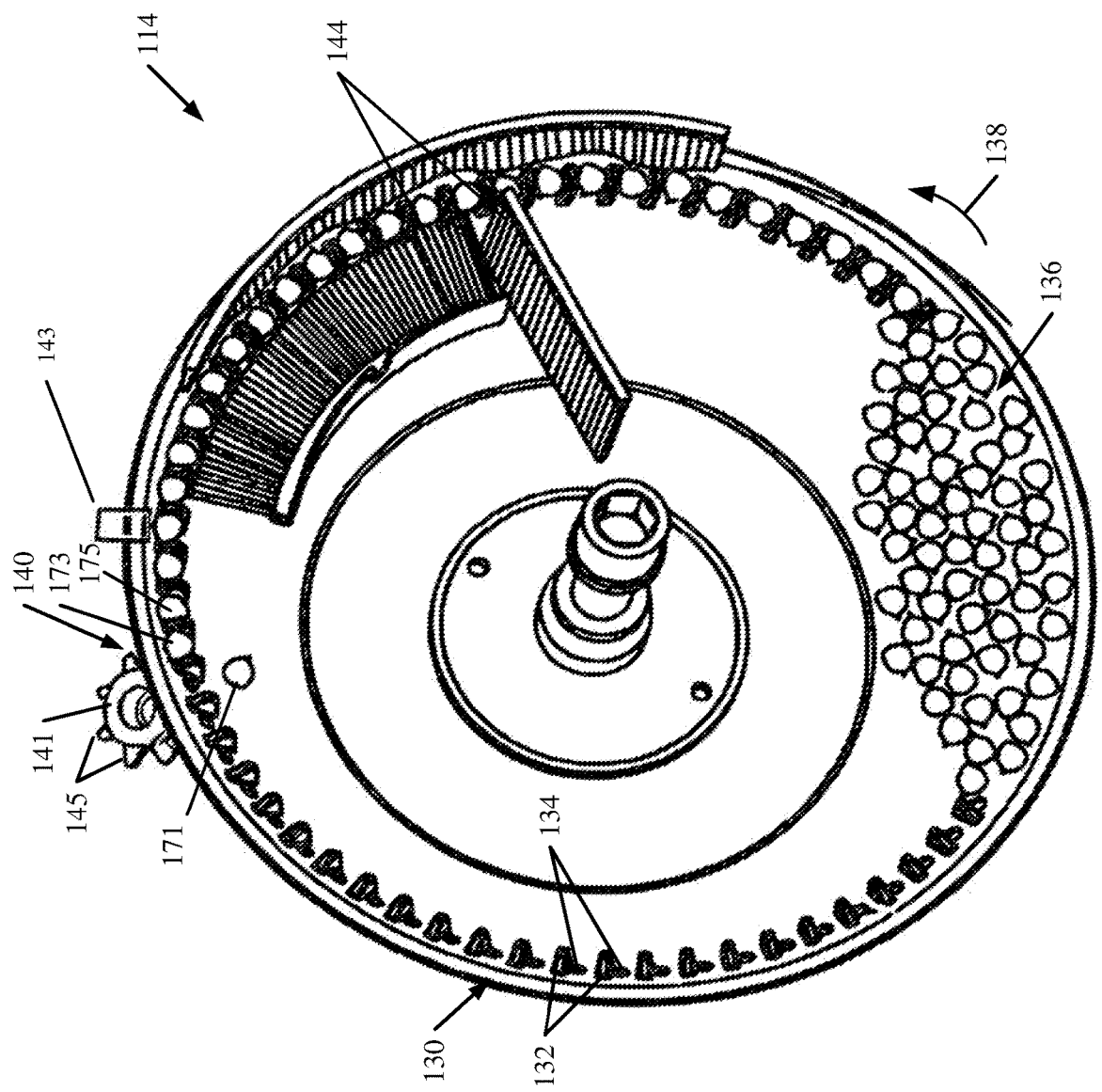
FIG. 3 is a perspective view of a portion of a seed metering system.

FIG. 3 shows one example of a rotatable mechanism that can be used as part of the seed metering system. The rotatable mechanism includes a rotatable disc, or concave element, 130. Rotatable element 130 has a cover (not shown) and is rotatably mounted relative to the frame 108 of the row unit 106. Rotatable element 130 is driven by a motor (shown in FIG. 4) and has a plurality of projections or tabs 132 that are closely proximate corresponding apertures 134. A seed pool 136 is disposed generally in a lower portion of an enclosure formed by rotating mechanism 130 and its corresponding cover. Mechanism 130 is rotatably driven by its machine (such as an electric motor, a pneumatic motor, a hydraulic motor, etc.) for rotation generally in the direction indicated by arrow 138, about a hub. A pressure differential is introduced into the interior of the metering mechanism so that the pressure differential influences seeds from seed pool 136 to be drawn to apertures 134. For instance, a vacuum can be applied to draw the seeds from seed pool 136 so that they come to rest in apertures 134, where the vacuum holds them in place. Alternatively, a positive pressure can be introduced into the interior of the metering mechanism to create a pressure differential across apertures 134 to perform the same function.

Once a seed comes to rest in (or proximate) an aperture 134, the vacuum or positive pressure differential acts to hold the seed within the aperture 134 such that the seed is carried upwardly generally in the direction indicated by arrow 138, from seed pool 136, to a seed discharge area 140. It may happen that multiple seeds are residing in an individual seed cell. In that case, a set of brushes or other members 144 that are located closely adjacent the rotating seed cells tend to remove the multiple seeds so that only a single seed is carried by each individual cell. Additionally, a sensor 143 is also illustratively mounted adjacent to rotating mechanism 130 as will be discussed in FIG. 4.

Once the seeds reach the seed discharge area 140, the vacuum or other pressure differential is illustratively removed, and a positive seed removal wheel, knock-out wheel 141, can act to remove the seed from the seed cell. Wheel 141 illustratively has a set of projections 145 that protrude at least partially into apertures 134 to actively dislodge the seed from those apertures. When the seed is dislodged, it is illustratively moved by the seed delivery system 116 (two examples of which are shown below in FIGS. 3A and 3B) to the furrow in the ground.

Figure 3A:
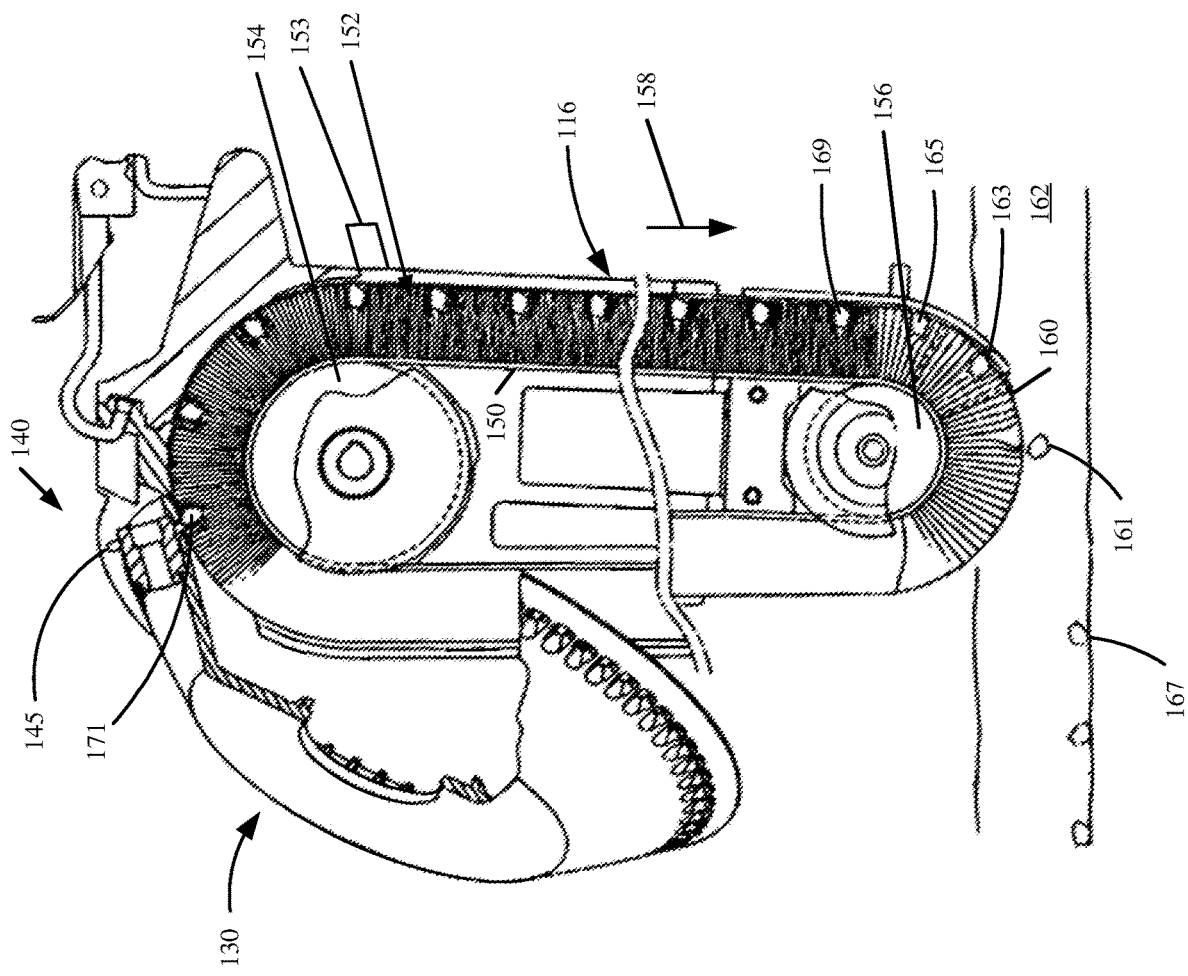
FIGS. 3A and 3B show two examples of different seed delivery systems that can be used with a seed metering system.

FIG. 3A shows an example where the rotating element 130 is positioned so that its seed discharge area 140 is above, and closely proximate, seed delivery system 116. In the example shown in FIG. 3A, seed delivery system 116 includes (e.g., a transport mechanism) a belt 150 with a brush that is formed of distally extending bristles 152 attached to belt 150. Belt 150 is mounted about pulleys 154 and 156. One of pulleys 154 and 156 is illustratively a drive pulley while the other is illustratively an idler pulley. The drive pulley is illustratively rotatably driven by a conveyance motor (shown in FIG. 4) which can be an electric motor, a pneumatic motor, a hydraulic motor, etc. Belt 150 is driven generally in the direction indicated by arrow 158.

Therefore, when seeds are moved by rotating element 130 to the seed discharge area 140, where they are discharged from the seed cells in rotating mechanism 130, they are illustratively positioned within the bristles (e.g., in a receiver) 152 by the projections 132 following each aperture that pushes the seed into the bristles. Seed delivery system 116 illustratively includes walls that form an enclosure around the bristles, so that, as the bristles move in the direction indicated by arrow 158, the seeds are carried along with them from the seed discharge area 140 of the metering mechanism, to a discharge area 160 either at ground level, or below ground level within a trench or furrow 162 that is generated by the furrow opener 120 on the row unit.

Additionally, a sensor 153 is also illustratively coupled to seed delivery system 116. As the seeds are moved within bristles 152, sensor 153 can detect the presence or absence of a seed as will be discussed below with respect to FIG. 4. It should also be noted that while the present description will proceed as having sensors 143 and 153, it is expressly contemplated that, in another example, only one sensor is used. Additional sensors can also be used.

Figure 3B:
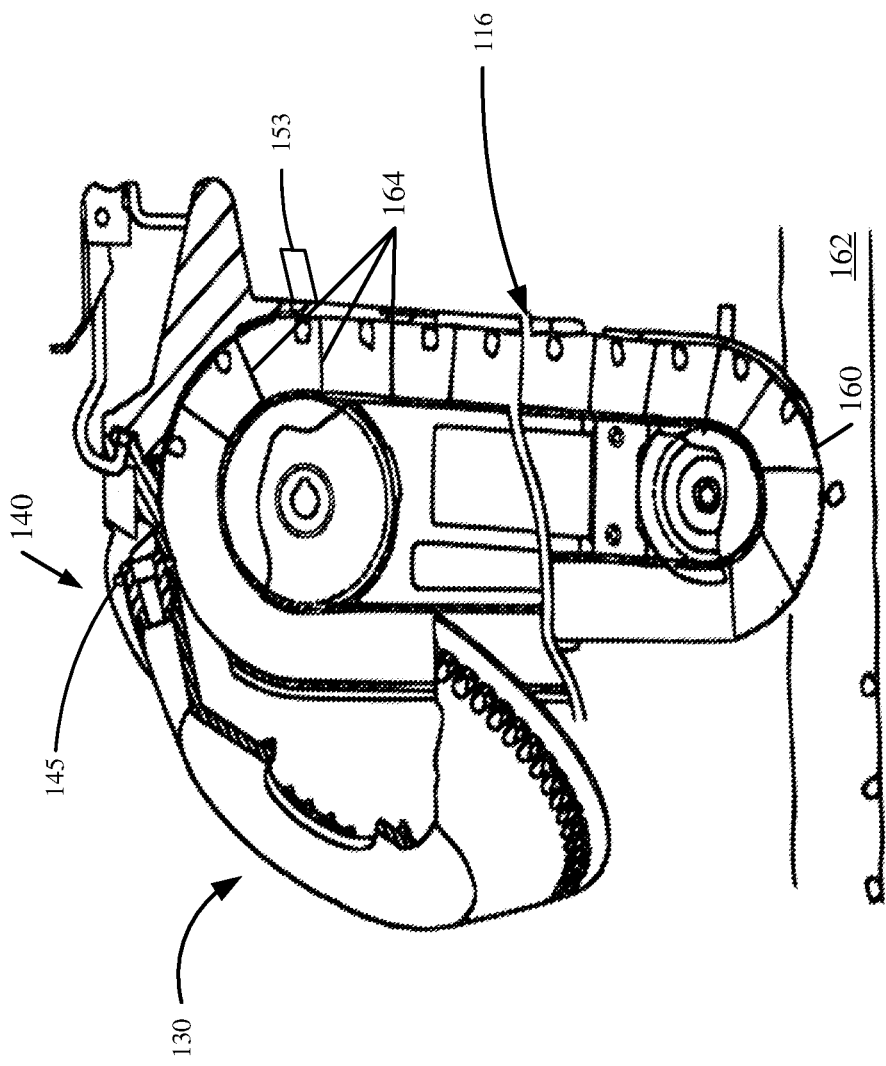

FIG. 3B is similar to FIG. 3A, except that seed delivery system 116 is not formed by a belt with distally extending bristles. Instead, it is formed by a flighted belt (transport mechanism) in which a set of paddles 164 form individual chambers (or receivers), into which the seeds are dropped, from the seed discharge area 140 of the metering mechanism. The flighted belt moves the seeds from the seed discharge area 140 to the discharge area 160 within the trench or furrow 162.

There are a wide variety of other types of delivery systems as well, that include a transport mechanism and a receiver that receives a seed. For instance, they include dual belt delivery systems in which opposing belts receive, hold and move seeds to the furrow, a rotatable wheel that has sprockets which catch seeds from the metering system and move them to the furrow, multiple transport wheels that operate to transport the seed to the furrow, an auger, among others. The present description will proceed with respect to a brush belt, but many other delivery systems are contemplated herein as well.

For a variety of reasons, a seed skip may be present within seed metering system 114 and/or seed delivery system 116. For instance, a seed skip may result from an irregularity in pressure differentials, seed size variability, foreign material present in the seed metering system 114 and/or the seed delivery system 116 or the brushes 144 removing all the seeds from a given aperture. The present description describes how this is sensed and how to control one or more of the motors driving seed metering system 114 and seed delivery system 116 to speed them up to compensate for a sensed seed skip.

Figure 4:
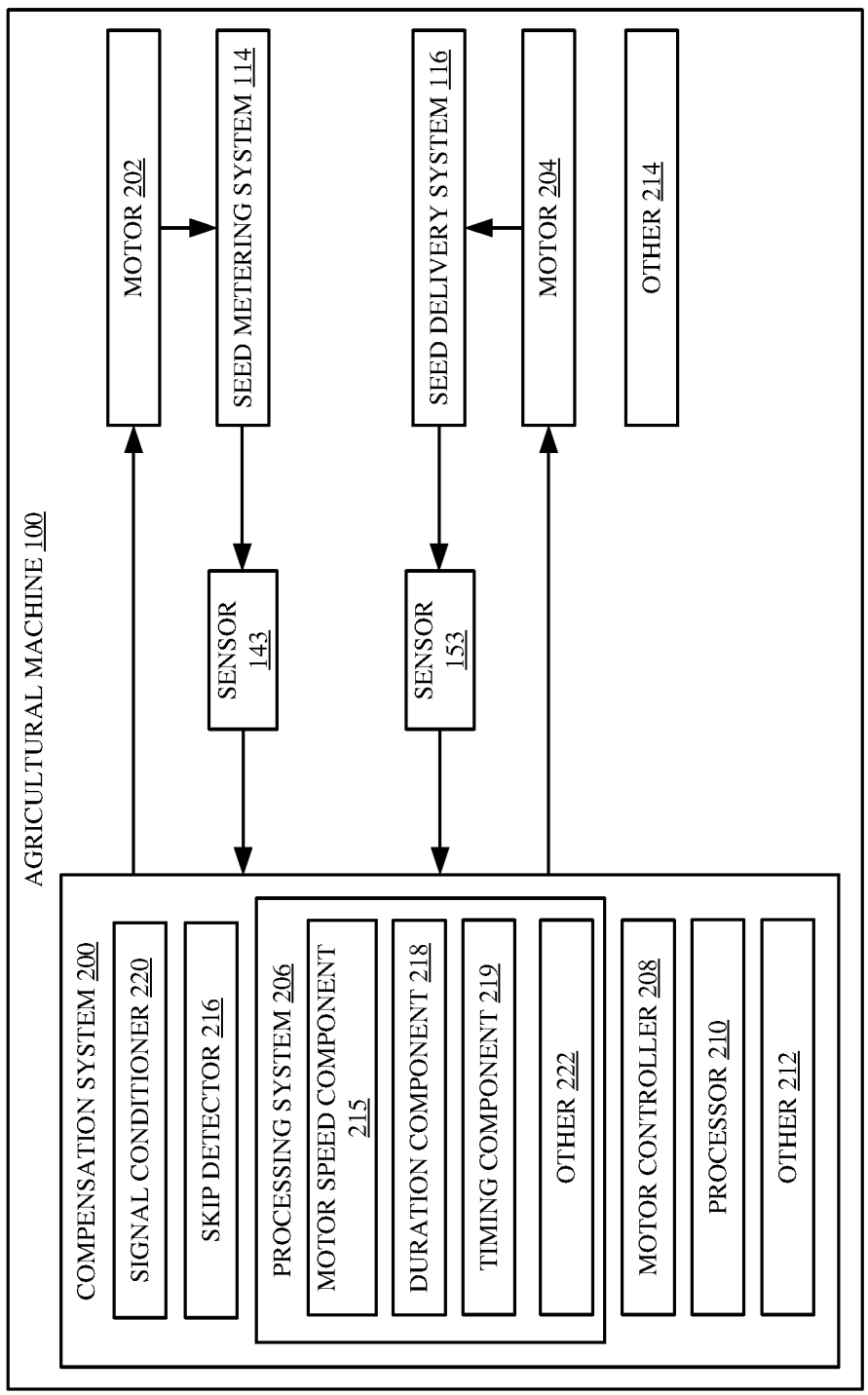
FIG. 4 is a simplified block diagram of one example of an agricultural machine.

FIG. 4 shows a block diagram of one example of a compensation system 200 that can be used on an agricultural machine 100. Compensation system 200 can be used to compensate for a detected seed skip within the seed metering system 114 and/or the seed delivery system 116. Some of the items shown in FIG. 4 are similar to those shown in the previous FIGS., and they are similarly numbered.

A number of things should be noted at the outset. The seed metering system 114 and the seed delivery system 116 can have a processing system in which compensation system 200 (or parts of it) are incorporated. For instance, compensation system 200 (or parts of it) can be included in a separate processing system that performs the metering and delivery control functions, to augment that processing system to perform skip compensation. For purposes of the present description, however, compensation system 200 is broken out separately and discussed in detail. This is just one example.

As illustratively shown, agricultural machine 100 includes seed metering system 114, seed delivery system 116, sensors 143 and 153, compensation system 200, motors 202 and 204, and other items 214. Seed metering system 114 and seed delivery system 116 are driven by motors 202 and 204, respectively. However, in another example, only one motor is used to drive both seed metering system 114 and seed delivery system 116. The present description proceeds with respect to two motors for the sake of example only.

Sensors 143 and 153 are illustratively coupled to seed metering system 114 and seed delivery system 116, respectively. Sensors 143 and 153 sense an operating characteristic of seed metering system 114 and seed delivery system 116, respectively. In one example, sensors 143 and 153 are seed sensors that are each mounted at a sensor location to sense a seed within seed metering system 114 and delivery system 116, respectively, as the seed passes the respective sensor location. In one example, sensors 143 and 153 are optical or reflective sensors and thus include a transmitter component and a receiver component. The transmitter component emits electromagnetic radiation, into seed metering system 114 and/or delivery system 116 in the case of a reflective sensor. The receiver component then detects the reflected radiation and generates a signal indicative of the presence or absence of a seed adjacent to sensor 143 and 153 based on the reflected radiation. With other sensors, radiation such as light, is transmitted through the seed metering system 114 or the delivery system 116. When the light beam is interrupted by a seed, the sensor signal varies, to indicate a seed. Thus, each sensor 143 and 153 generates a seed sensor signal that pulses or otherwise varies, and the pulses or variations are indicative of the presence of a seed passing the sensor location proximate the sensor.

For example, in regards to sensor 153, bristles 152 pass sensor 153 and absorb a majority of the radiation emitted from the transmitter. As a result, absent a seed, reflected radiation received by the receiver is relatively low. Alternatively, when a seed passes the sensor location where sensor 153 is mounted, more of the emitted light is reflected off the seed and back to the receiver, indicating the presence of a seed. The differences in the reflected radiation allow for a determination to be made as to whether a seed is, in fact, present. Additionally, in other examples, sensors 143 and 153 can include a camera and image processing logic that allow visual detection as to whether a seed is currently present within seed metering system 114 and/or seed delivery system 116, at the sensor location proximate the sensor.

Agricultural machine 100 also illustratively includes compensation system 200. Compensation system 200 detects a seed skip in seed metering system 114 and/or seed delivery system 116 using sensor signals generated by sensor(s) 143 and/or 153. A seed skip is an event where a seed is not detected by one of the seed sensors at a time when it should be detected. This is described in greater detail below. Upon detecting the seed skip, compensation system 200 generates a motor operating parameter and subsequently operates motor(s) 202 and/or 204 based on the motor operating parameter to compensate for the detected seed skip.

As illustratively shown, compensation system 200 includes a signal conditioner 220, a skip detector 216, a skip processing system 206 (that includes a motor speed component 215, duration component 218 and a timing component 219), a motor controller 208, a processor 210 and any other components 212 that can be used in accordance with various examples. In one example, a signal generated by sensor(s) 143 and/or 153 is conditioned by signal conditioner 220. This can include amplifying the generated sensor signal, performing filtering, linearization, normalization and/or any other conditioning which can improve the quality of the sensor signal. The conditioned signal is then provided to skip detector 216. Skip detector 216 can include a controller or processor that receives the sensor signal (which may be conditioned) and determines whether there is a seed skip in seed metering system 114 and/or seed delivery system 116. In one example, skip detector 216 can detect a time lapse since the sensor signal indicated detection of the last seed. If it has been too long since the last seed was detected, then skip detector 216 detects a seed skip. Additionally, this can include a threshold determination. For instance, the time intervals between seed detections may vary, acceptably, within a threshold time. Thus, skip detector 216 may wait to detect a seed skip until the seed sensor has failed to detect a seed for at least the threshold time. More specifically, in one example, skip detector 216 distinguishes between seed sensor signals that indicate background noise (indicating an absence of a seed) and a pulse (indicating the presence of a seed). As skip detector 216 receives the generated sensor signals, skip detector 216 can measure the time between pulses and can determine whether a seed skip is present in seed metering system 114 and/or seed delivery system 116 based on that time. In one example skip detector 216 receives a reference indicating how fast motors 202 and/or 204 are moving and thus knows how long a time should pass between seed detections. If that time is exceeded, by a given threshold, then skip detector 216 can generate a skip signal indicating that a seed skip has occurred.

Once a seed skip has been detected, an indication (e.g., the skip signal) is provided to processing system 206. In one example, upon receiving an indication of a seed skip in seed metering system 114 and/or seed delivery system 116, processing system 206 determines how much the motors 202 and/or 204 need to be accelerated to compensate for the seed skip. System 206 also determines when motors 202 and/or 204 should be accelerated, and for how long. It will be noted that, in one example, it is expressly contemplated that the functions of processing system 206 can be incorporated into skip detector 216. However, in the illustrated example, processing system 206 is separate and includes motor speed component 215, duration component 218, and timing component 219 and it can include any other components as well Motor speed component 215 determines an operating speed of motor(s) 202 and/or 204 that will be used to allow a subsequent seed, following the seed skip, to effectively replace the seed that was skipped. For example, after a seed, just prior to the seed skip, is placed in the furrow, the speed of motors 202 and/or 204 is increased so that a next subsequent seed (the seed following the detected seed skip) can be moved to and deposited in the furrow more quickly. Thus, the seed following the detected seed skip will replace the skipped seed in the furrow. For example, referring again to FIG. 3A, assume that seed 161 is just discharged from seed delivery system 116 and assume that seed 163 is not present. The absence of seed 163 will have been detected earlier by one of sensors 143 and 153 and by skip detector 216, as a seed skip. After seed 161 is deposited in the furrow, processing system 206 generates a signal to causing motor controller 208 to increase the speed of motor 204 (and possibly motor 202) to at least twice its normal speed, then seed 165 can be deposited in the furrow, relative to seed 161, approximately where seed 163 would have been deposited if there had been no seed skip. Thus, motor speed component 215 determines how fast the motors must be driven to compensate for the detected seed skip. Additionally, duration component 218 determines an amount of time to run motor(s) 202 and/or 204 at the increased operating speed to compensate for the detected seed skip without disrupting a normal spacing in which the seeds are delivered to a furrow at predefined spacings. For instance, if the motor speed is increased before seed 161 is deposited, this may induce a roll of seed 161 when it is deposited and also seed 161 will be placed closer to seed 167. If the motor speed is increased for too long a duration, then this may also induce a roll of seed 169 and also seed 169 will be closer to seed 165.

Based on the output from processing system 206, motor controller 208 operates motor(s) 202 and/or 204 in accordance with the generated operating parameter to compensate for the detected seed skip. By controlling motor(s) 202 and/or 204 to increase their operating speed until just prior to when the subsequent seed following the seed skip is released and then returning the motors to a normal operating speed at (or just prior to) the release of the seed following the seed skip, a seed skip is effectively compensated for by delivering the subsequent seed (the seed after the seed skip) to the furrow in accordance with a normal seed spacing.

It will also be noted that the motors 202 and/or 204 can be accelerated to more than twice their normal speed. This will allow time to decelerate the motors to their normal operating speed before a next subsequent seed is placed in the furrow. This reduces the possibility of inducing a roll on that seed when it is deposited, yet still compensates for the detected seed skip.

While either motor 202 or 204 can be operated to increase their speed following a seed skip, in one example, both motors 202 and 204 are operated to increase their speeds substantially simultaneously. For example, if motor 204 is operated to increase its speed as described above, and motor 202 is operated at normal speed, an error might arise creating new seed skips based on the difference in operating parameters. For instance, referring again to FIG. 3A, if the brush belt in delivery system 116 is operating at twice its normal speed (to compensate for a seed skip where seed 163 is missing) but meter 130 is operating at the normal speed, this will effectively introduce another seed skip after seed 171. Therefore, in accordance with one example, when the speed of motor 204 is increased, the speed of motor 202 is correspondingly increased.

In another example, where only the speed of one motor (e.g., motor 204) is increased, then it may be increased by a lower amount, such as by increasing it to 1.5 times its normal speed. This will reduce the spacing between seeds 161 and 165 but will also not introduce a full seed skip after seed 171. All of these, and other, control scenarios are contemplated herein. Another example is also contemplated herein. In this example, the seed skip is detected in metering system 114. Assume, for instance, that the sensor 143 (in FIG. 3) has detected that seed 173 is not present. This will introduce a seed skip between seeds 171 and 175. In order to compensate for the seed skip, compensation system 200 increases the speed of motor 202, after seed 171 is discharged into delivery system 116 by knockout 141. It maintains operation of motor 202 at the increased speed (such as at twice its normal speed) until seed 175 is discharged into delivery system 116. Then, it returns the speed of motor 202 to its normal operating speed. In this way, seed 175 is discharged into delivery system 116, at a position spaced from seed 171, that generally corresponds to the predefined seed spacing, thus substantially compensating for the skipped seed 173.

It should also be noted that where motor(s) 202 and/or 204 are operated at an increased operating speed, seed sensors 143, 153, or skip detector 216 (or all of them) may not accurately sense seeds because they will be moving past the sensors at an increased rate. This may be erroneously identified as a seed skip. Therefore, in one example, seed sensors 143, 153 and skip detector 216 are configured to sense seed presence when the seed is traveling at the increased speed.

Figure 5:
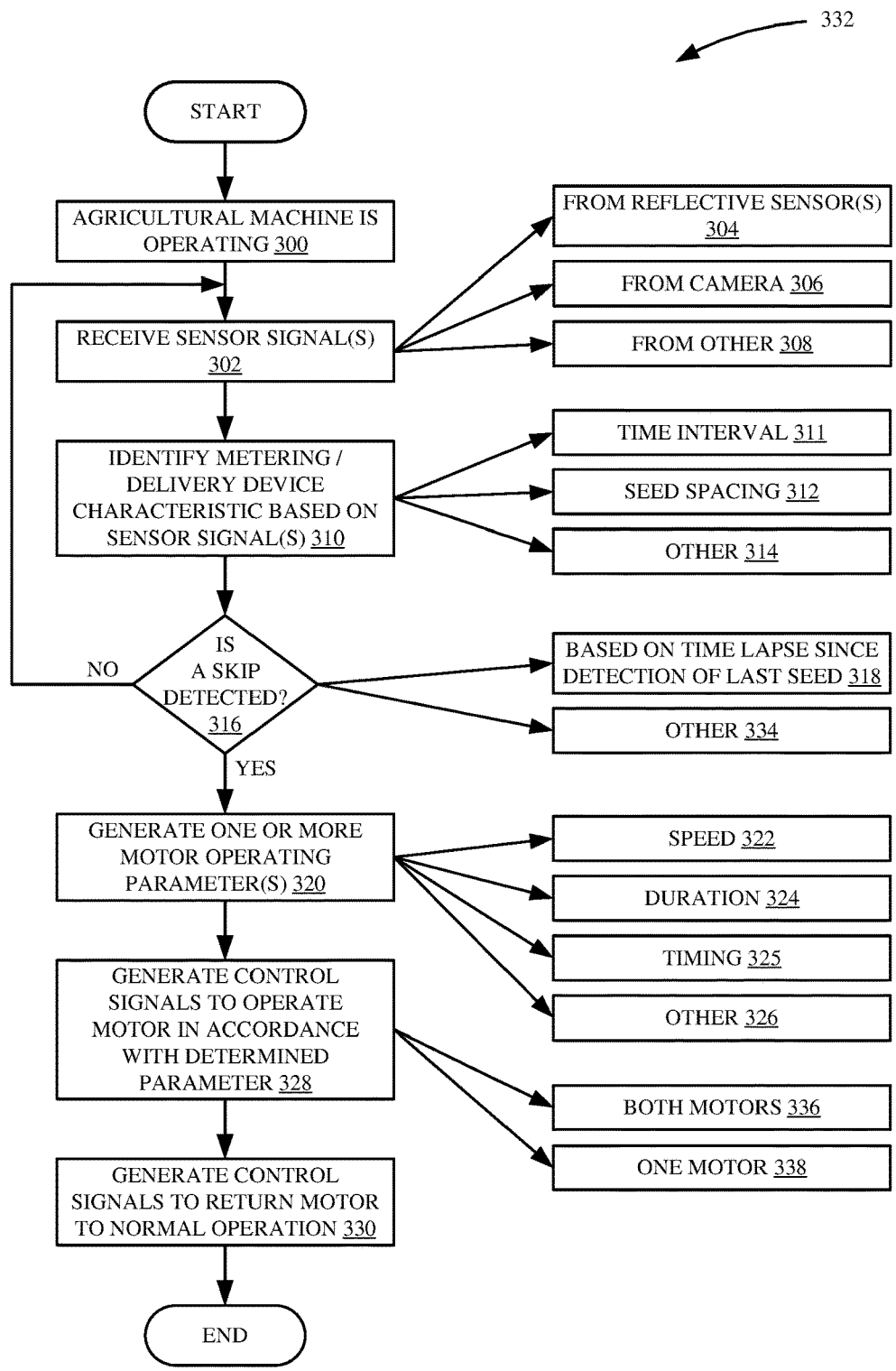
FIG. 5 is a flow diagram of one example of the operation of the agricultural machine shown in FIG. 4.

FIG. 5 is a flow diagram illustrating one example of the operation of the compensation system shown in FIG. 4 in compensating for a seed skip detected in either or both of seed metering system 114 and delivery system 116. It is first assumed that agricultural machine 100 is operating. This is indicated by block 300 in FIG. 5. Skip detector 216 receives sensor signal(s) from either or both sensors 143 and 153. This is indicated by block 302. In one example, sensors 143 and 153 can be reflective sensors as indicated in block 304. In another example, sensors 143 and 153 can be image sensors, such as cameras, as indicated in block 306. However, it is to be understood that sensors 143 and 153 can be any other type of seed sensor 308 as well. Skip detector 216 then illustratively identifies a seed metering system or delivery system characteristic based on the received sensor signals. This is indicated in block 310. This can include determining a seed detection time interval since a last seed detection, as indicated by block 311. It can include determining a seed spacing (such as identifying a time since a last seed detection and combining that with a rate of speed of the meter or delivery system, as indicated in block 312). Additionally, it can include determining another characteristic. This is indicated in block 314.

Skip detector 216 then determines whether a seed skip is present in seed metering system 114 and/or a delivery system 116. This is indicated in block 316. By way of example, this can be based on a time lapse that has occurred since the last detected seed and an expected time between seed detections. If the time lapse since the last seed was detected exceeds the expected time between seed detections (e.g., by a threshold amount) then a seed skip may be identified. This is indicated in block 318. Skip detector 216 can also detect a seed skip in other ways as well, as indicated by block 334.

If, at block 316, no seed skip has occurred, then processing simply reverts back to block 302. Skip detector 216 continues to receive sensor signals from the various sensors.

However, if, at block 316, it is determined that a seed skip has been identified, then processing system 206 generates one or more motor operating parameters. This is indicated in block 320. In one example, this includes determining a motor speed, indicated by block 322. It can include a duration parameter identifying a duration for which the motor should be operated at the increased speed. This is indicated by block 324. It can also include a timing parameter indicative of a timing for the increase in motor speed. For instance, the motor speed may be increased at a time right after the seed prior to the seed skip is deposited in the furrow or discharged from the metering system 114 into the delivery system 116. Generating the timing parameter is indicated by block 325. It can also include generating other motor operating parameters as indicated in block 326. The motor operating parameter can allow the motor controller to operate the motor of either the seed metering system 114 or delivery system 116, or both, to effectively compensate for the detected seed skip. For example, the determined motor speed can be greater than a normal operating speed, allowing the seeds within the seed metering system or the delivery system (or both) to travel a greater distance per unit of time to make up for the skipped seed.

Motor controller 208 then generates one or more control signals to operate motor(s) 202 and/or 204 based on the parameters. This is indicated in block 328. Controlling both motors is indicated by block 336. Controlling one motor is indicated by block 338.

After operating either or both motors driving the seed metering system 114 and/or the delivery system 116 in accordance with the operating parameter, to compensate for the detected seed skip, motor controller 208 can then return to controlling the motors according to their normal operating parameters. This is indicated in block 330. For example, motor controller 208 can then return the motor(s) to their original operating speeds such that seeds within the seed metering system and delivery system are metered and subsequently delivered at normal, predefined seed spacing.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of the other components or items in those systems.

Also, the figures show a number of blocks with functionality ascribed to each block. It will be noted that fewer blocks can be used so the functionality is performed by fewer components. Also, more blocks can be used with the functionality distributed among more components.

It should also be noted that the different examples described herein can be combined in different ways. That is, parts of one or more examples can be combined with parts of one or more other examples. All of this is contemplated herein.

Example 1 is an agricultural machine, comprising:
a seeding system configured to meter and deliver seed;
a motor configured to drive movement of seeds in the seeding system,
a sensor configured to sense a characteristic of the seeding system and generate a sensor signal indicative of the characteristic;
a skip detector component configured to receive the sensor signal and detect a seed skip in the seeding system;
a processing system configured to receive an indication of the detected seed skip, and, based on the indication of the detected seed skip, generate an operating parameter for the motor; and
a motor controller configured to receive the operating parameter and operate the motor based on the operating parameter.

Example 2 is the agricultural machine of any or all previous examples wherein the seeding system comprises:
a movable element configured to move seeds, positioned relative to one another at a predetermined seed spacing, along a delivery route.

Example 3 is the agricultural machine of any or all previous examples wherein the sensor is disposed at a sensor location along the delivery route and is configured to sense, as the sensed characteristic of the seeding system, a seed presence as the seed moves past the sensor location.

Example 4 is the agricultural machine of any or all previous examples wherein the skip detector is configured to detect the seed skip by identifying that the seeds are positioned further from one another than predetermined the speed spacing on the movable element.

Example 5 is the agricultural machine of any or all previous examples wherein the processing system is configured to generate the operating parameter as an increased motor operating speed, to compensate, at least partially, for the detected seed skip.

Example 6 is the agricultural machine of any or all previous examples wherein the processing system is configured to generate a speed duration parameter indicative of an amount of time to operate the motor at the increased motor operating speed to increase the speed of the movable element to at least partially compensate for the detected seed skip.

Example 7 is the agricultural machine of any or all previous examples wherein the processing system is configured to generate a timing parameter indicative of a timing when the motor controller is to increase the motor speed to the increased motor operating speed.

Example 8 is the agricultural machine of any or all previous examples wherein the motor speed is increased above a first motor operating speed and wherein the motor controller is configured to control the motor to increase its operating speed to the increased motor operating speed for the amount of time indicated by the speed duration parameter, and at a time indicated by the timing parameter.

Example 9 is the agricultural machine of any or all previous examples wherein the motor controller is further configured to control the motor speed to decrease it from the increased motor operating speed to the first motor operating speed after the amount of time indicated by the speed duration parameter has passed.

Example 10 is the agricultural machine of any or all previous examples wherein the seeding system comprises:
a seed metering system on a row unit; and
a seed delivery system on the row unit.

Example 11 is the agricultural machine of any or all previous examples wherein the motor comprises:
a first motor driving the seed metering system; and
a second motor driving the seed delivery system, wherein the processing system is configured to generate an increased motor operating speed parameter for both the first and second motors and wherein the motor controller controls the first and second motors to increase their operating speed based on the increased motor operating speed parameters.

Example 12 is the agricultural machine of any or all previous examples wherein the seed metering system comprises:
a rotatable metering component, configured to meter seed, wherein the first motor is a metering motor configured to drive the rotatable metering component, and wherein the skip detector component is configured to detect the seed skip in the rotatable metering component.

Example 13 is the agricultural machine of any or all previous examples wherein the seed delivery system comprises:
a transport mechanism comprising a receiver configured to receive metered seeds, and wherein the motor is a conveyance motor configured to drive the transport mechanism, wherein the skip detection component is configured to detect the seed skip in the transport mechanism.

Example 14 is an agricultural machine, comprising:
a metering system configured to receive and meter a seed;
a first motor, coupled to the metering system, configured to drive the metering system at a first metering system operating speed;
a delivery system configured to receive the metered seed from the metering system and deliver the metered seed to a furrow;
a second motor, coupled to the delivery system, configured to drive the delivery system at a first delivery system operating speed; and
a skip compensation system configured to detect a seed skip in either of the metering system or the delivery system and, in response to detecting the seed skip, determine a motor operating parameter and operate at least one of the first and the second motors in accordance with the motor operating parameter.

Example 15 is the agricultural machine of any or all previous examples wherein the skip compensation system comprises:
a seed detector coupled to one of the delivery system and the metering system at a sensor location and configured to detect a seed as the seed moves past the sensor location, and generate a seed sensor signal indicative of the sensed seed.

Example 16 is the agricultural machine of any or all previous examples wherein the skip compensation system comprises:
a processing system configured to identify, as the motor operating parameter, an increased speed indicator indicative of an increased motor speed at which the at least one of the first and second motors is to be driven to at least partially compensate a seed spacing, between seeds delivered to the furrow by the delivery system, for the detected seed skip.

Example 17 is the agricultural machine of any or all previous examples wherein the skip compensation system comprises:
a motor controller configured to control the at least one of the first and second motors at the increased motor speed indicated by the increased speed indicator.

Example 18 is the agricultural machine of any or all previous examples wherein the skip compensation system is configured to determine a timing when the motor controller is to begin controlling the at least one of the first and second motors at the increased motor speed indicated by the increased speed indicator and a duration for which the motor controller is to control the at least one of the first and second motors at the increased motor speed indicated by the increased speed indicator.

Example 19 is a method of controlling an agricultural machine, comprising:
metering seeds to a seed delivery system;
delivering the seeds, as a sequence of spaced seeds, at a predefined spacing, to a furrow with the seed delivery system;
detecting a seed skip in the sequence of spaced seeds; and
controlling a speed at which the seeds are metered or delivered to maintain the predefined spacing, in the furrow, through the detected seed skip in the sequence of spaced seeds.

Example 20 is the method of any or all previous examples wherein controlling a speed comprises:
increasing the speed at which the seed is metered and delivered for a time beginning after a seed in the sequence of seeds immediately prior to the seed skip is delivered to the furrow, and ending prior to a seed immediately after the seed skip in the sequence of seeds is delivered to the furrow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural machine, comprising:
a seeding system comprising:
a metering component configured to meter seed; and
a transport mechanism configured to transport the metered seeds along a delivery route from a first location where the seeds are received from the metering component to a second location where the seeds are released from the transport mechanism;
a motor configured to drive movement of the transport mechanism to transport the seeds along the delivery route;
a sensor configured to sense a characteristic of the transport mechanism at a sensor location along the delivery route and to generate a sensor signal indicative of the characteristic;
a skip detector component configured to receive the sensor signal and detect a seed skip in the in the transport mechanism:
a processing system configured to receive an indication of the detected seed skip, and, based on the indication of the detected seed skip, generate an operating parameter; and a motor controller configured to receive the operating parameter and operate the motor to control movement of the transport mechanism based on the operating parameter.

2. The agricultural machine of claim 1 wherein the transport mechanism comprises:
a movable element configured to move the seeds, positioned relative to one another at a predetermined seed spacing along the delivery route.

3. The agricultural machine of claim 2 wherein the sensor is configured to sense, as the sensed characteristic of the seeding system, a seed presence as the seed moves past the sensor location in the transport mechanism.

4. The agricultural machine of claim 3, wherein the skip detector is configured to detect the seed skip by identifying that the seeds are positioned further from one another than the predetermined speed spacing along the delivery route.

5. The agricultural machine of claim 4 wherein the processing system is configured to generate the operating parameter as an increased motor operating speed, to compensate, at least partially, for the detected seed skip.

6. The agricultural machine of claim 5 wherein the processing system is configured to generate a speed duration parameter indicative of an amount of time to operate the motor at an increased motor operating speed to increase the speed of the movable element to at least partially compensate for the detected seed skip.

7. The agricultural machine of claim 6 wherein the processing system is configured to generate a timing parameter indicative of a timing when the motor controller is to increase the motor speed to the increased motor operating speed.

8. The agricultural machine of claim 7 wherein the motor speed is increased above a first motor operating speed and wherein the motor controller is configured to
control the motor to increase its operating speed to the increased motor operating speed for the amount of time indicated by the speed duration parameter, and at a time indicated by the timing parameter; and
control the motor speed to decrease it from the increased motor operating speed to the first motor operating speed after the amount of time indicated by the speed duration parameter has passed.

9. The agricultural machine of claim 3 wherein the transport mechanism comprises:
a brush belt; and
a receiver configured to receive the metered seeds.

10. The agricultural machine of claim 1 wherein the motors comprises a first motor driving the transport component, and further comprising a second motor driving the metering mechanism, wherein the processing system is configured to generate an increased motor operating speed parameter for both the first and second motors and wherein the motor controller controls the first and second motors to increase their operating speed based on the increased motor operating speed parameters.

11. The agricultural machine of claim 1 wherein the first motor controls the movement of the transport mechanism independent of the movement of the metering component.

12. An agricultural machine, comprising:
a metering system configured to receive and meter a seed;
a metering system motor configured to drive the metering system;
a delivery system configured to receive the metered seed from the metering system and deliver the metered seed along a delivery route to a furrow;
a delivery system motor, coupled to the delivery system, and configured to drive the delivery system;
a sensor positioned at a sensor location along the delivery route and configured to generate a sensor signal indicative of seed presence at the sensor location; and
a control system configured to:
a motor operating speed parameter and operate the delivery system motor based on the motor operating speed parameter.

13. The agricultural machine of claim 12 wherein the sensor comprises:
a seed detector coupled to the delivery system and configured to detect a seed as the seed moves past the sensor location, and generate the sensor signal indicative of the sensed seed.

14. The agricultural machine of claim 12 wherein the metering system and delivery systems motors are operable independently of one another, such that a speed of the metering system is controllable independent of a speed of the delivery system.

15. The agricultural machine of claim 12 wherein the control system comprises:
a motor controller configured to control a first increased speed of the metering system motor based on the increased motor operating speed parameter and to control a second increased speed of the delivery system motor based on the increased motor operating speed indicator; and
wherein the first increased speed is determined by a motor speed component based on the second increased speed.

16. The agricultural machine of claim 15 wherein the control system is configured to determine a timing when a motor controller is to begin controlling the first and second motors at the increased motor speed indicated by the increased speed indicator and a duration for which the motor controller is to control the metering system motor and delivery system motor at the increased motor speed indicated by the increased speed indicator.

17. A method of controlling an agricultural machine, comprising:
metering seeds to a seed delivery system comprising a transport mechanism;
controlling the transport mechanism to deliver the seeds, as a sequence of spaced seeds in the transport mechanism, at a predefined spacing, to a furrow with the seed delivery system;
detecting a seed skip in the sequence of spaced seeds in the transport mechanism; and
controlling a speed of the transport mechanism based on the detected seed skip in the sequence of spaced seeds to maintain the predefined spacing in the furrow.

18. The method of claim 17 wherein controlling the speed of the transport mechanism comprises:
increasing the speed at which the seed is delivered by the transport mechanism for a time beginning after a seed in the sequence of seeds immediately prior to the seed skip is delivered to the furrow by the transport mechanism, and ending prior to a seed immediately after the seed skip in the sequence of seeds is released by the transport mechanism to the furrow.

19. The method of claim 17, wherein the transport mechanism comprises a brush belt.

20. The method of claim 17, wherein
the transport mechanism transports the seeds along a delivery route;

metering the seeds comprises operating a seed metering system to meter the seeds to the transport mechanism at a first location along the delivery route; and detecting the seed skip comprises receiving sensor signals from a sensor at a sensor location along the delivery route between the first location and a second location at which the seeds are released from the transport mechanism to the furrow.

* * * * *